US012583713B2

(12) United States Patent
Weber et al.

(10) Patent No.: US 12,583,713 B2
(45) Date of Patent: Mar. 24, 2026

(54) EXTENDABLE EVACUATION BRIDGE FOR AN ELEVATOR

(71) Applicant: Inventio AG, Hergiswil (CH)

(72) Inventors: Stefan Weber, Niederwil (CH); Longhong Wang, Shanghai (CN); Zhihui Zhang, Shanghai (CN); Janey Wang, Shanghai (CN); Marco Caplazi, Beinwil (CH)

(73) Assignee: INVENTIO AG, Hergiswil (CH)

( * ) Notice: Subject to any disclaimer, the term of this patent is extended or adjusted under 35 U.S.C. 154(b) by 0 days.

(21) Appl. No.: 18/719,854

(22) PCT Filed: Dec. 12, 2022

(86) PCT No.: PCT/EP2022/085298

§ 371 (c)(1),
(2) Date: Jun. 14, 2024

(87) PCT Pub. No.: WO2023/117514

PCT Pub. Date: Jun. 29, 2023

(65) Prior Publication Data

US 2025/0051133 A1 Feb. 13, 2025

(30) Foreign Application Priority Data

Dec. 22, 2021 (EP) .................................... 21216985

(51) Int. Cl.
*B66B 5/02* (2006.01)

(52) U.S. Cl.
CPC .................................. *B66B 5/027* (2013.01)

(58) Field of Classification Search
CPC ...................................................... B66B 5/027
See application file for complete search history.

(56) References Cited

U.S. PATENT DOCUMENTS 3,213,964 A * 10/1965 Tucker .................... E04G 1/152 182/180.1
5,988,317 A * 11/1999 Riding ...................... E04G 1/34 182/152

FOREIGN PATENT DOCUMENTS

| | | | | |
|---|---|---|---|---|
| CN | 213141065 U | 5/2021 | | |
| DE | 102009005607 B4 * | 1/2011 | .............. | E04G 7/28 |
| EP | 3440001 B1 | 1/2020 | | |
| JP | S5918767 U | 2/1984 | | |
| JP | H06255920 A | 9/1994 | | |

(Continued)

*Primary Examiner* — Diem M Tran
(74) *Attorney, Agent, or Firm* — Shumaker, Loop & Kendrick, LLP

(57) ABSTRACT

An evacuation bridge for bridging a horizontal gap between two elevator cars of an elevator system in an emergency situation includes: a support structure having a base plate and at least one side part, wherein the base plate is attachable at its ends to evacuation openings of the elevator cars to form a walkway between the evacuation openings; wherein the side part is mounted movably between a first position and a second position to the base plate so that an overall width of the support structure is adjustable to a first overall width by moving the side part in the first position and to a second overall width by moving the side part in the second position; and wherein the first overall width is smaller than an individual width of each evacuation opening and the second overall width is larger than the individual width of each evacuation opening.

11 Claims, 3 Drawing Sheets

(56) References Cited

FOREIGN PATENT DOCUMENTS

| | | | | |
|---|---|---|---|---|
| JP | 2003104636 | A | | 4/2003 |
| JP | 2007186302 | A | | 7/2007 |
| JP | 5676550 | B2 | * | 2/2015 |
| JP | 2020090355 | A | * | 6/2020 |
| KR | 19980023249 | U | * | 7/1998 |
| WO | 2017001200 | A1 | | 1/2017 |

* cited by examiner

EXTENDABLE EVACUATION BRIDGE FOR AN ELEVATOR

FIELD

The invention relates to an evacuation bridge for bridging a horizontal gap between two elevator cars of an elevator system in an emergency situation. The invention further relates to an elevator system having at least one such evacuation bridge.

BACKGROUND

Elevator systems may comprise one or more elevator cars for transporting people or goods between different floors of a building. For example, at least two such elevator cars may be movable along parallel travel paths in a vertical elevator shaft.

If one of the elevator cars gets stuck in the elevator shaft, the other elevator car may be used to evacuate the people from the stuck elevator car. In this case, the other elevator car may be placed next to the stuck elevator car and an evacuation bridge may be installed to bridge a horizontal gap between the two elevator cars so that people from the stuck elevator car can walk over the evacuation bridge to the other elevator car.

Each elevator car may have a separate evacuation opening through which people may be evacuated in an emergency situation. Such evacuation openings may be relatively narrow. In some cases, a mandatory width of the evacuation bridge may be even larger than a (mandatory) individual width of the evacuation openings. In addition, the evacuation bridge should be sufficiently rigid to avoid unwanted vibrations when people walk across the evacuation bridge.

Examples for evacuation bridges are described in CN 213141065 U and EP 3 440 001 B1.

SUMMARY

It is an objective of the invention to enable simplifying the installation of an evacuation bridge in an elevator system. Particularly, it is an objective of the invention to provide an evacuation bridge having a sufficient width and/or stability, wherein the evacuation bridge may be installed in a simple and quick manner.

At least one of these objectives may be achieved by the subject-matter of the exemplary embodiments that are evident from the following description.

A first aspect of the invention relates to an evacuation bridge for bridging a horizontal gap between two elevator cars of an elevator system in an emergency situation, e.g., when one of the elevator cars is stuck for some reason. Each elevator car has an evacuation opening for evacuating people from one elevator car to the other elevator car. The evacuation bridge comprises: a support structure having a base plate and at least one side part, wherein the base plate is attachable at each of its ends to one of the evacuation openings to form a walkway between the two evacuation openings, wherein the side part is mounted movably between a first position and a second position to the base plate so that an overall width of the support structure is adjustable to a first overall width by moving the side part in the first position and to a second overall width by moving the side part in the second position, wherein the first overall width is smaller than an individual width of each evacuation opening and the second overall width is larger than the individual width of each evacuation opening.

For example, the support structure may be designed for having a deflection of 5 cm or less when loaded with a weight of at least 100 kg and with the side part being in the second position.

The base plate may comprise one or more plate elements which may be supported by one or more longitudinal members and/or one or more cross members. The width of the base plate may be smaller than the individual width of each evacuation opening. It may be that the first overall width corresponds to the width of the base plate. In other words, the base plate may be the widest part of the support structure when the side part is in the first position.

The side part may be a foldable, rotatable and/or slidable part of the support structure. It is possible that at least one of the side part and the base plate is designed for having a deflection of 5 cm or less when loaded with a weight of at least 100 kg.

The evacuation bridge has the advantage that it can be used with elevator cars having relatively narrow evacuation openings. In addition, the evacuation bridge can be easily transported and installed in a few simple steps.

A second aspect of the invention relates to an elevator system comprising: an elevator shaft; at least two elevator cars, each of which having an evacuation opening for evacuating people from one elevator car to the other elevator car, wherein the elevator cars can be positioned next to each other in the elevator shaft in an emergency situation so that the evacuation openings are separated from each other by a horizontal gap; and at least one evacuation bridge as described above and below, wherein an individual width of each evacuation opening is larger than the first overall width of the support structure of the evacuation bridge and smaller than the second overall width of the support structure of the evacuation bridge.

According to an embodiment of the invention, the side part may be mounted rotatably or pivotably between the first position and the second position to the base plate via at least one hinge. For example, the hinge may connect the side part to the base plate in such a way that a rotation axis of the side part is substantially parallel to a longitudinal direction of the base plate. In this way, the overall width of the support structure can be easily adjusted by folding the side part(s) in or out. For more stability, the side part may be mounted to the base plate via at least two such hinges.

According to an embodiment of the invention, a fixing plate may be attached at one of its ends to the side part and may protrude with its other end from the side part. The other end of the fixing plate may overlap a portion of the base plate when the side part is in the second position. The other end of the fixing plate and the portion of the base plate may each have at least one pin hole, the pin hole of the other end of the fixing plate and the pin hole of the portion of the base plate facing each other to form a pin seat when the side part is in the second position. A pin may be insertable into the pin seat to lock the side part in place. The inserted pin may go through the base plate and the fixing plate. This locks the side part in the second position. In other words, the side part cannot be moved back to the first positon as long as the pin sits in the pin seat. It is possible that the side part and the base plate touch each other and/or are pressed against each other when the side part is locked in this way.

The fixing plate may be mountable to the side plate in different positions with respect to a lateral and/or longitudinal direction of the side plate, e.g., by means of one or more slot holes in the fixing plate and/or the side plate.

According to an embodiment of the invention, the pin has a tapered portion which is insertable into the pin seat. This ensures that the pin is firmly seated in the pin seat. It may be that, in the second position of the side part, a longitudinal edge of the side part faces a longitudinal edge of the base plate. In this case, inserting the tapered portion in the pin seat may result in a lateral movement of the fixing plate relatively to the base plate so that the longitudinal edges are brought closer together or even pressed against each other. This minimizes play between the side part and the base plate and significantly increases the rigidity of the support structure.

According to an embodiment of the invention, the hinge and the fixing plate may be attached to opposite sides of the side part. This has the effect that the side part is supported at opposite sides when moved and/or locked in the second position, which increases the rigidity of the support structure.

According to an embodiment of the invention, the evacuation bridge may further comprise at least one bridge railing, wherein the bridge railing is attachable to the side part. For example, the bridge railing may be attachable by means of a manual clamping device, which, for example, may comprise one or more knobs and/or levers for quick attachment and removal of the bridge railing. By attaching the bridge railing(s) to the side part(s), the full width of the base plate can be used as a walkway. The guide of the bridge railing can be in vertical direction up or down.

According to an embodiment of the invention, the first overall width and the second overall width may differ from each other by more than 5 cm, preferably by more than 10 cm, and/or by less than 50 cm, preferably by less than 20 cm. This ensures that the evacuation bridge is wide enough and/or has a mandatory width when installed between the two elevator cars.

According to an embodiment of the invention, the side part, in the second position, may protrude from a longitudinal edge of the base plate. A protruding portion of the side part may have a length that corresponds to at least 20%, preferably at least 40%, more preferably at least 60%, of a length of the base plate and/or may have a width that corresponds to at least 10%, preferably at least 20%, more preferably at least 30%, of a width of the base plate.

According to an embodiment of the invention, the support structure may have two side parts mounted movably between the first position and the second position to opposite sides of the base plate. The side parts may be substantially identical parts. It may be that the side parts are moved in opposite directions when each of them is moved in the second position and/or back to the first position. In this way, the evacuation bridge can be easily extended on both sides.

In one possible alternative evacuation bridge, which is not detected by the subject matter of the invention yet, the side part is detachably mounted to the base plate so that an overall width of the support structure is adjustable from the first overall width to a second overall width by mounting the side part to the base plate. The overall width of the support structure basically corresponds with width of the base plate. The side part which is detachably mounted to the base plate to the base plate may extend outwards from the base plate enlarging the overall width of the support structure. Thus, the side part can be temporary connected for evacuation.

The bridge railing may be attached to the side part and forming an integral component which can be detachably mounted to the base plate.

The evacuation bridge may comprise at least one thumb lock for the plug-in or pluggable connection of the side part to the base plate.

The evacuation bridge may comprise, for the detachably mounting, at least one connector being formed by a wedge or a cone. The wedge or cone can be inserted in corresponding form-fitting mounts.

The side part may be mounted to the base plate via a plug-in connection.

Further benefits and advantages of the present invention will become apparent after a careful reading of the detailed description with appropriate reference to the accompanying drawings.

Below, embodiments of the present invention are described in more detail with reference to the attached drawings. It is to be understood that these drawings depict only exemplary embodiments of the invention and are not therefore to be considered to be limiting in scope.

The figures are merely schematic and not to scale. Identical reference signs in the various drawings denote identical or identically acting features.

DETAILED DESCRIPTION

Figure 1:
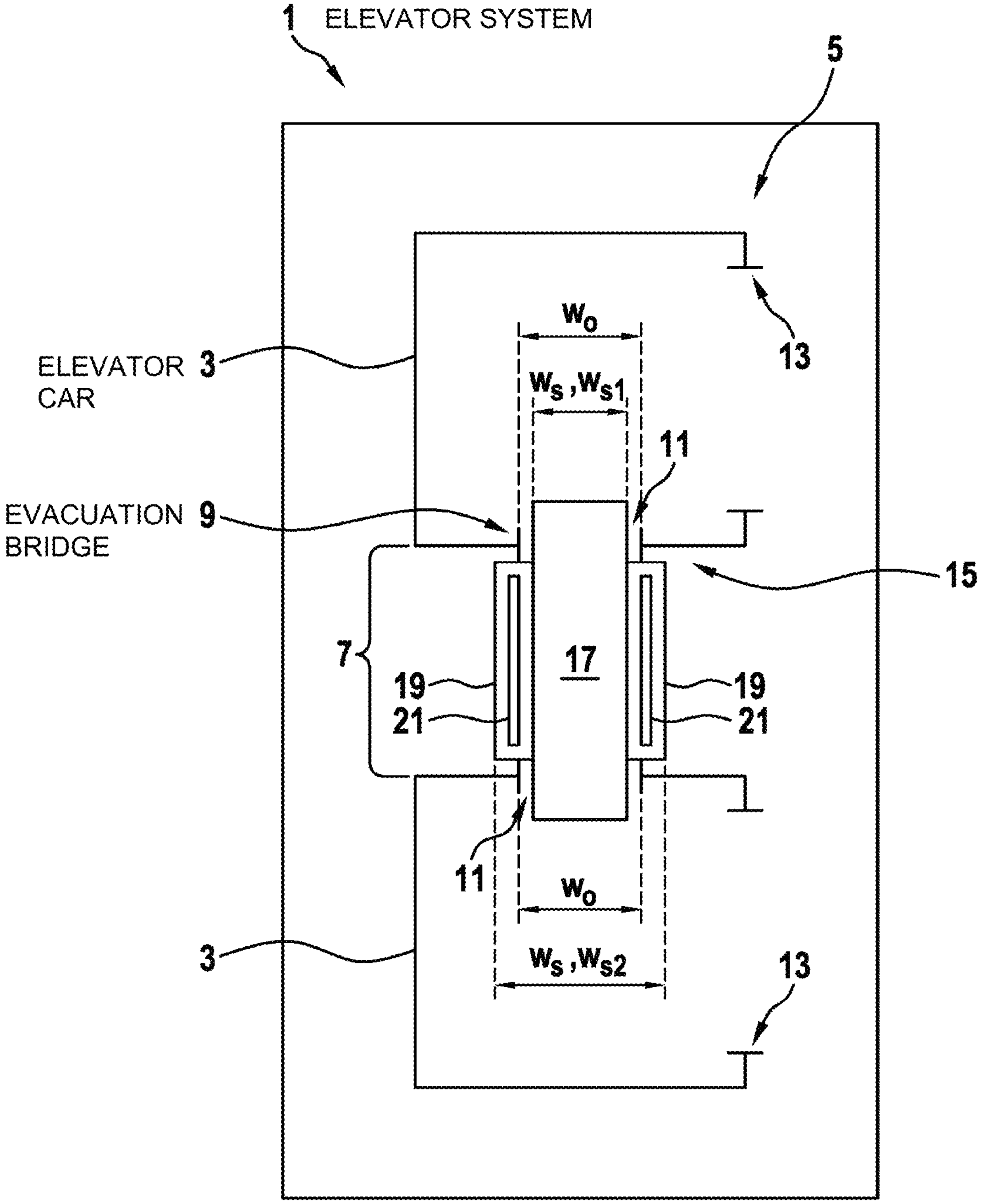
FIG. 1 shows an elevator system according to an embodiment of the invention.

FIG. 1 shows a top view of an elevator system 1 with two elevator cars 3 which are arranged next to each other in a vertical elevator shaft 5. The elevator cars 3 are separated by a horizontal gap 7. This may be the case when one of the elevator cars 3 is stuck and the other elevator car 3 is placed next to the stuck elevator car 3 in order to evacuate people from the stuck elevator car 3. In such an emergency situation, an evacuation bridge 9 may be used to bridge the horizontal gap 7.

Each elevator car 3 may have an evacuation opening 11 in addition to a door opening 13 for evacuating people from one elevator car 3 to the other elevator car 3. The evacuation opening 11 may be significantly narrower than the door opening 13.

In this example, the evacuation bridge 9 comprises a support structure 15 composed of a base plate 17 and two side parts 19 which are mounted movably between a first position and a second position to opposite long sides of the base plate 17. The base plate 17 may be attached at each of its ends to one of the elevator cars 3 at a position close to the evacuation openings 11 to form a walkway between the two evacuation openings 11.

Figure 2:
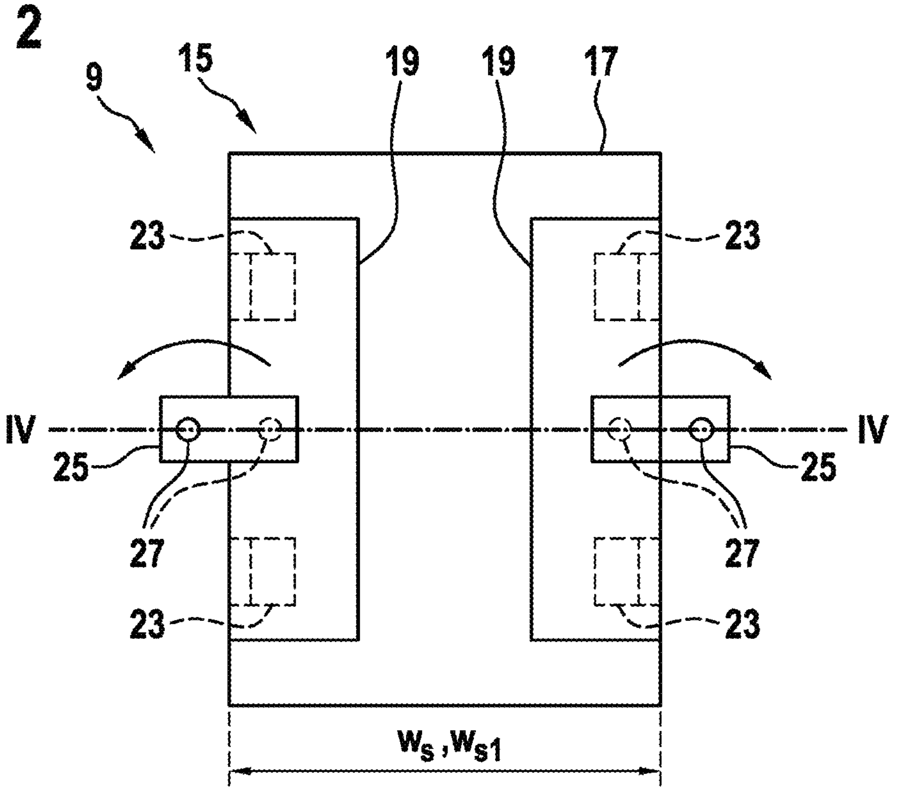
FIG. 2 shows a top view of an evacuation bridge according to an embodiment of the invention in a first position.
Figure 3:
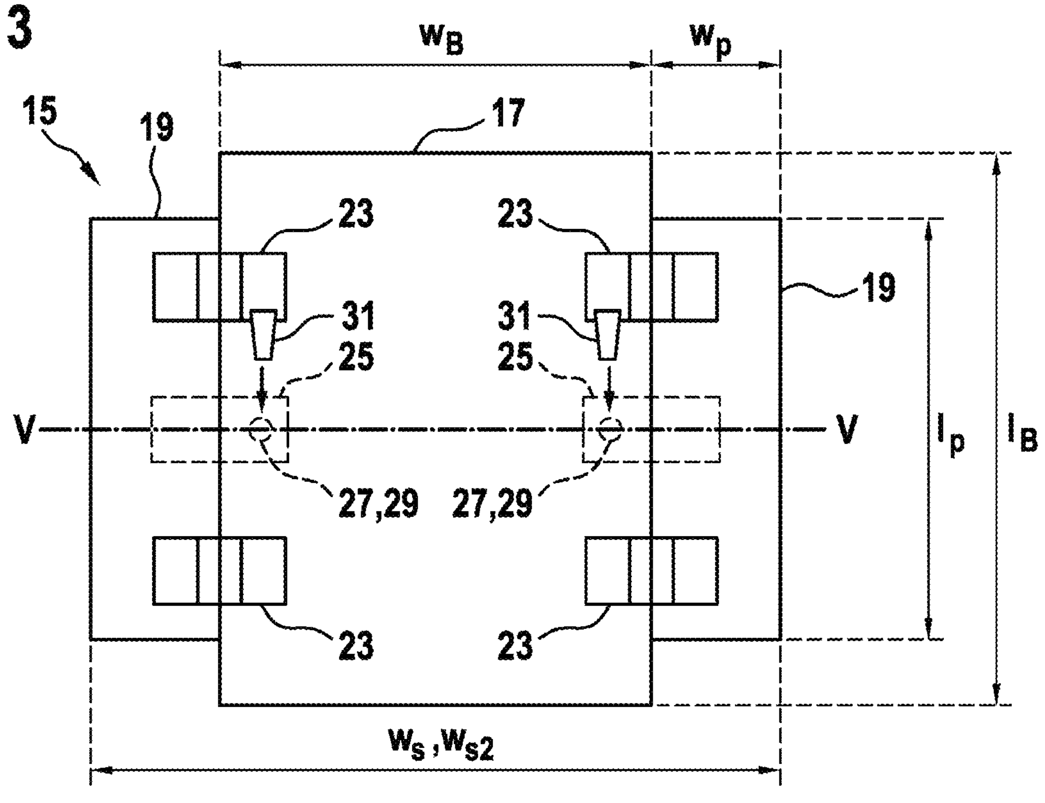
FIG. 3 shows a top view of the evacuation bridge of FIG. 2 in a second position.
Figure 4:
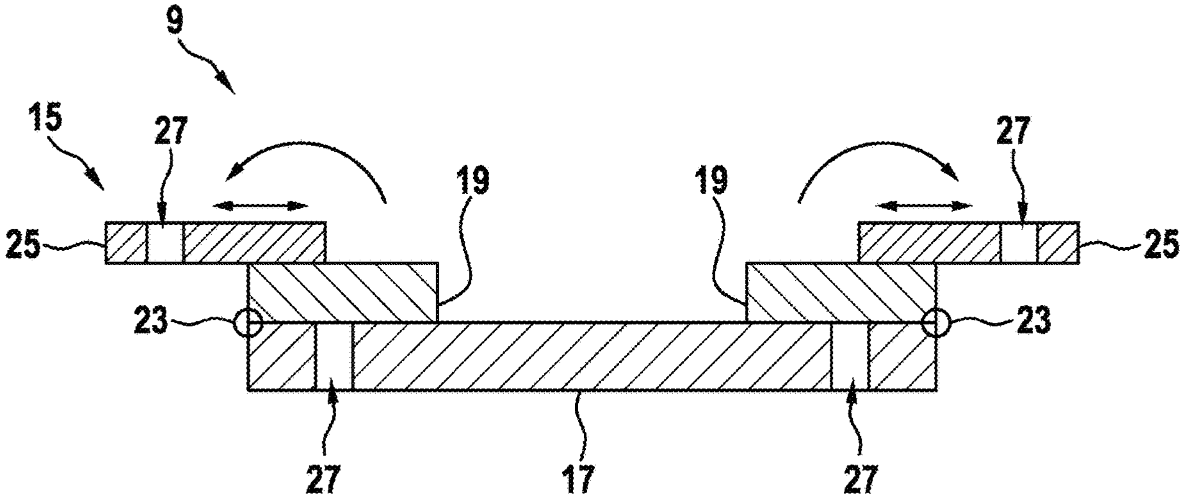
FIG. 4 shows a cross section view of the evacuation bridge of FIG. 2 along line IV-IV.
Figure 5:
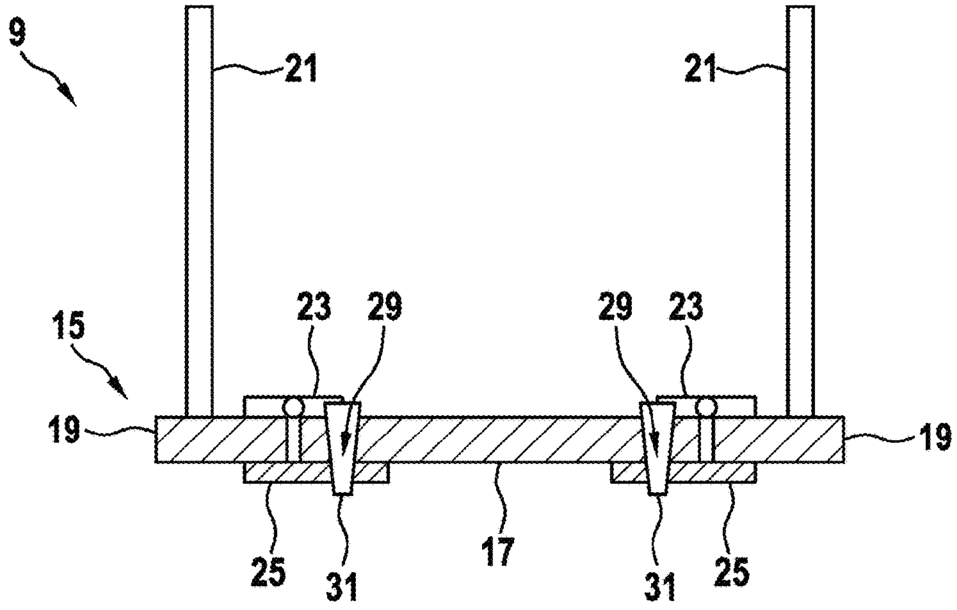
FIG. 5 shows a cross section view of the evacuation bridge of FIG. 3 along line V-V.

FIG. 1, as well as FIG. 3 and FIG. 5, shows the second position of the side parts 19. The first position of the side parts 19 is shown in FIG. 2 and FIG. 4.

By moving the side parts 19 in the first position, an overall width $w_S$ of the support structure 15 can be adjusted to a first overall width $w_{S1}$, which is significantly smaller than an individual width $w_O$ of each evacuation opening 11. Inversely, by moving the side parts 19 in the second position, the overall width $w_S$ can be adjusted to a second overall width $w_{S2}$, which is significantly larger than the individual width $w_O$.

This has the advantage that the support structure 15, with the side parts 19 being in the first position, can be pushed flat through the evacuation openings 11. Once attached to both elevator cars 3 at or close to the evacuation openings 11, the support structure 15 can be easily extended by moving, e.g., rotating, pivoting and/or sliding, the side parts 19 in opposite directions in the second position.

It is possible that the evacuation openings 11 of the two elevator cars 3 have different individual widths $w_O$. In this case, the first overall width $w_{S1}$ may be smaller than the smallest of the different individual widths $w_O$ and/or the second overall width $w_{S2}$ may be larger than the largest of the different individual widths $w_O$.

For example, the difference between the first overall width $w_{S1}$ and the second overall width $w_{S2}$ may be between 5 cm and 50 cm, preferably between 10 cm and 20 cm.

Referring to FIG. 3, the side parts 19, when moved in the second position, may each protrude from a longitudinal edge of the base plate 17. In this case, the protruding portion of each side part 19 may have a length $l_P$ that corresponds to at least 20%, preferably at least 40%, more preferably at least 60%, of a length $l_B$ of the base plate 17 and/or a width $w_P$ that corresponds to at least 10%, preferably at least 20%, more preferably at least 30%, of a width $w_B$ of the base plate 17.

Each side part 19 may support a bridge railing 21, which may be clamped and/or screwed to the respective side part 19 in the second position (see FIG. 5).

In this particular example, each side part 19 is mounted rotatably to the base plate 17 via two hinges 23. FIG. 2 and FIG. 4 show the support structure 15 with the side parts 19 folded in. In this first position, the overall width $w_S$ of the support structure 15 may correspond to the width $w_B$ of the base plate 17. FIG. 1, FIG. 3 and FIG. 5 show the support structure 15 with the side parts 19 folded out.

Additionally, each side part 19 may have a fixing plate 25 which is mounted at one of its ends to the respective side part 19 and protrudes with its other end from a longitudinal edge of the respective side part 19. Each protruding end may have at least one pin hole 27.

The base plate 17 may also have a pin hole 27 for each pin hole 27 in the fixing plates 25. The pin holes 27 of the base plate 17 may be arranged in outer edge regions of the base plate 17.

The pin holes 27 may be arranged in such a way that, when the side parts 19 are in the second position, each pin hole 27 of the side parts 19 faces one pin hole 27 in the base plate 17 to form a pin seat 29 into which a pin 31 can be inserted. Inserting the pins 31 has the effect that the side parts 19 are locked in place, i.e., in the second position. The inserted pins 31 may go through the base plate 17 and the respective fixing plate 25. Consequently, the side parts 19 cannot be moved back to the first positon unless the pins 31 are removed from the pin seats 29.

As shown in FIG. 2 and FIG. 3, the pin hole(s) 27 may be arranged between the two hinges 23 of each side part 19.

Each pin 31 may be tapered or may have a tapered end which can be inserted into the pin seat 29. This ensures that the pin 31 is firmly seated in the pin seat 29 and may minimize play between the base plate 17 and the side parts 19.

For example, inserting the (tapered) pins 31 may have the effect that a longitudinal edge of each side part 19 is pressed against a longitudinal edge of the base plate 17. This helps to further increase the rigidity of the support structure 15.

For more stability, the hinges 23 and the fixing plate 25 may be attached to opposite sides of the respective side part 19.

As can be seen in FIG. 4, the fixing plates 25 may be mountable to the side plates 19 in different positions with respect to the width direction of the support structure 15 (indicated with two double arrows).

It is possible that each side part 19 has two or more than two fixing plates 25 and/or that each fixing plate 25 has at least two pin holes 27.

Alternatively, it is possible that the side part is detachably mounted to the base plate (not shown). Thus, the side part can be temporary connected for evacuation purposes.

The various embodiments described above are provided by way of illustration only and should not be construed to limit the invention. It is to be understood that many other possible modifications and variations can be made without departing from the scope of the present invention. It is, therefore, contemplated that the appended claim or claims will cover such modifications and variations that fall within the true scope of the invention.

In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage.

In accordance with the provisions of the patent statutes, the present invention has been described in what is considered to represent its preferred embodiment. However, it should be noted that the invention can be practiced otherwise than as specifically illustrated and described without departing from its spirit or scope.

LIST OF REFERENCE SIGNS

- 1 elevator system
- 3 elevator car
- 5 elevator shaft
- 7 gap
- 9 evacuation bridge
- 11 evacuation opening
- 13 door opening
- 15 support structure
- 17 base plate
- 19 side part
- 21 bridge railing
- 23 hinge
- 25 fixing plate
- 27 pin hole
- 29 pin seat
- 31 pin
- $l_B$ length of base plate
- $l_P$ length of side part
- $w_B$ width of base plate
- $w_O$ width of evacuation opening
- $w_P$ width of side part
- $w_S$ overall width of support structure
- $w_{S1}$ first overall width of support structure
- $w_{S2}$ second overall width of support structure

The invention claimed is:

1. An evacuation bridge for bridging a horizontal gap between two elevator cars of an elevator system in an emergency situation, wherein each of the elevator cars has an evacuation opening for evacuating people from one elevator car to the other elevator car, the evacuation bridge comprising:

a support structure having a base plate and a side part;

wherein the base plate is attachable at each of opposite ends to one of the evacuation openings to form a walkway between the two evacuation openings bridging the gap between the two elevator cars, and the base plate has opposite sides extending between the opposite ends;

wherein the side part is mounted by at least one hinge having a pivot axis arranged on and extending parallel to one of the sides of the base plate and is rotatable about the at least one hinge between a first position and a second position such that an overall width of the support structure is adjustable to a first overall width by moving the side part in the first position and to a second overall width by moving the side part in the second position; and wherein the first overall width is smaller than an individual width of each of the evacuation openings and the second overall width is larger than the individual width of each of the evacuation openings.

2. The evacuation bridge according to claim 1 including a fixing plate having one end attached to the side part and another end protruding from the side part, wherein the another end of the fixing plate overlaps a portion of the base plate when the side part is in the second position.

3. The evacuation bridge according to claim 2 wherein the another end of the fixing plate and the portion of the base plate each have a pin hole formed therein, the pin hole in the another end of the fixing plate facing the pin hole in the portion of the base plate to form a pin seat when the side part is in the second position, wherein the side part is locked in the second position when a pin is inserted into the pin seat.

4. The evacuation bridge according to claim 3 wherein the pin has a tapered portion adapted to be inserted into the pin seat.

5. The evacuation bridge according to claim 2 wherein the at least one hinge and the fixing plate are attached to opposite sides of the side part.

6. The evacuation bridge according to claim 1 including a bridge railing adapted to be removably attached to the side part when the side part is in the second position.

7. The evacuation bridge according to claim 1 wherein the first overall width and the second overall width differ in a range of 5 cm to 50 cm.

8. The evacuation bridge according to claim 1 wherein the first overall width and the second overall width differ in a range of 10 cm to 20 cm.

9. The evacuation bridge according to claim 1 wherein, in the second position, a portion of the side part protrudes from a longitudinal edge of the base plate, the protruding portion having a length in a range of 20% to 60% of a length of the base plate and/or the protruding portion having a width in a range of 10% to 30% of a width of the base plate.

10. An elevator system comprising:

an elevator shaft;

two elevator cars movable in the elevator shaft, each of the elevator cars having an evacuation opening for evacuating people from the elevator car, wherein when the elevator cars are positioned next to each other in the elevator shaft in an emergency situation the evacuation openings are separated by a horizontal gap; and the evacuation bridge according to claim 1, wherein an individual width of each of the evacuation openings is larger than the first overall width of the support structure of the evacuation bridge and is smaller than the second overall width of the support structure of the evacuation bridge.

11. An evacuation bridge for bridging a horizontal gap between two elevator cars of an elevator system in an emergency situation, wherein each of the elevator cars has an evacuation opening for evacuating people from one elevator car to the other elevator car, the evacuation bridge comprising:

a support structure having a base plate and two side parts;

wherein the base plate is attachable at each of opposite ends to one of the evacuation openings to form a walkway between the two evacuation openings bridging the gap between the two elevator cars, and the base plate has opposite sides extending between the opposite ends;

wherein the side parts are each mounted by at least one hinge having a pivot axis arranged on and extending parallel to one of the opposite sides of the base plate and each of the side parts is rotatable about the at least one hinge between a first position and a second position such that an overall width of the support structure is adjustable to a first overall width by moving the side parts in the first position and to a second overall width by moving the side parts in the second position; and wherein the first overall width is smaller than an individual width of each of the evacuation openings and the second overall width is larger than the individual width of each of the evacuation openings.

* * * * *